United States Patent
Wall

(10) Patent No.: US 8,325,891 B2
(45) Date of Patent: Dec. 4, 2012

(54) ANTI-LOOPING FOR A MULTIGATEWAY MULTI-CARRIER NETWORK

(75) Inventor: Jeffrey S. Wall, Dallas, TX (US)

(73) Assignee: IntelePeer, Inc., San Mateo, CA (US)

( * ) Notice: Subject to any disclaimer, the term of this patent is extended or adjusted under 35 U.S.C. 154(b) by 89 days.

(21) Appl. No.: 12/884,293

(22) Filed: Sep. 17, 2010

(65) Prior Publication Data

US 2012/0069980 A1    Mar. 22, 2012

(51) Int. Cl.
*H04M 15/00* (2006.01)
*H04M 7/00* (2006.01)

(52) U.S. Cl. ............ 379/112.1; 379/221.07; 379/221.14

(58) Field of Classification Search ............ 379/112.05, 379/112.1, 133, 219, 221.01, 221.03, 221.07, 379/221.04
See application file for complete search history.

(56) References Cited

U.S. PATENT DOCUMENTS

| | | | |
|---|---|---|---|
| 6,463,037 B1 * | 10/2002 | Ooyoshi et al. | 370/242 |
| 6,657,971 B1 | 12/2003 | Costa | |
| 7,010,102 B1 * | 3/2006 | Huynh | 379/112.1 |
| 2004/0028032 A1 * | 2/2004 | Rantanen et al. | 370/352 |
| 2004/0190705 A1 * | 9/2004 | Taff et al. | 379/211.02 |
| 2005/0276408 A1 * | 12/2005 | McDonald et al. | 379/219 |
| 2006/0126517 A1 | 6/2006 | Kurosaki et al. | |

* cited by examiner

*Primary Examiner* — Quoc D Tran
(74) *Attorney, Agent, or Firm* — DLA Piper LLP (US)

(57) ABSTRACT

The present invention relates to systems and methods for detecting and terminating a looping condition occurring in a telecommunications network comprising receiving a call offer comprising receiving call identification data associated with the call offer at a switching component, querying a looping engine using the call identification data to detect a looping condition, identifying a number of occurrences of the call identification data within a predetermined time frame, comparing the number of occurrences against a predetermined count, and returning a message to the switching component based on the comparison, the message indicating whether a looping condition exists in the telecommunications network.

42 Claims, 5 Drawing Sheets

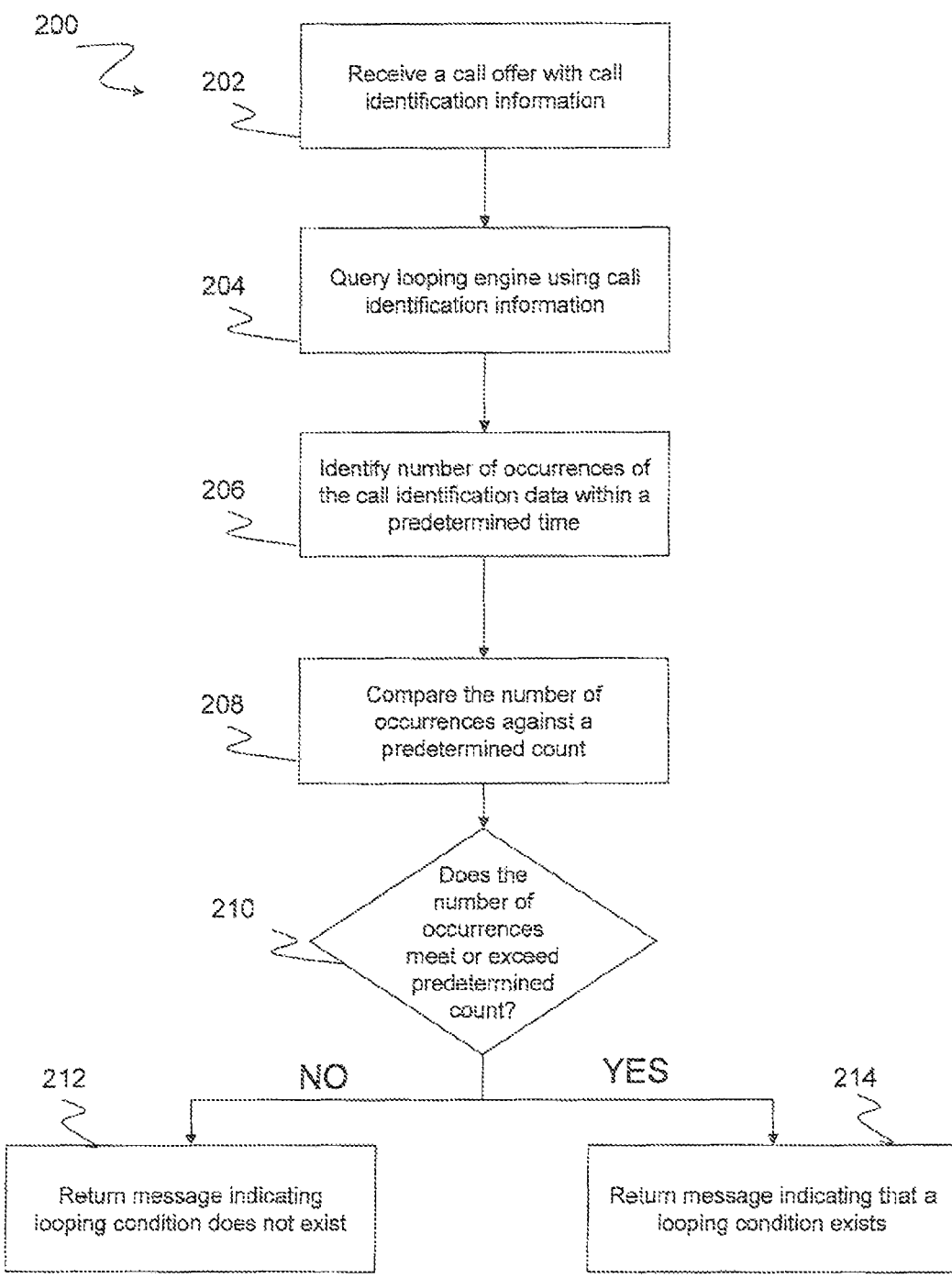

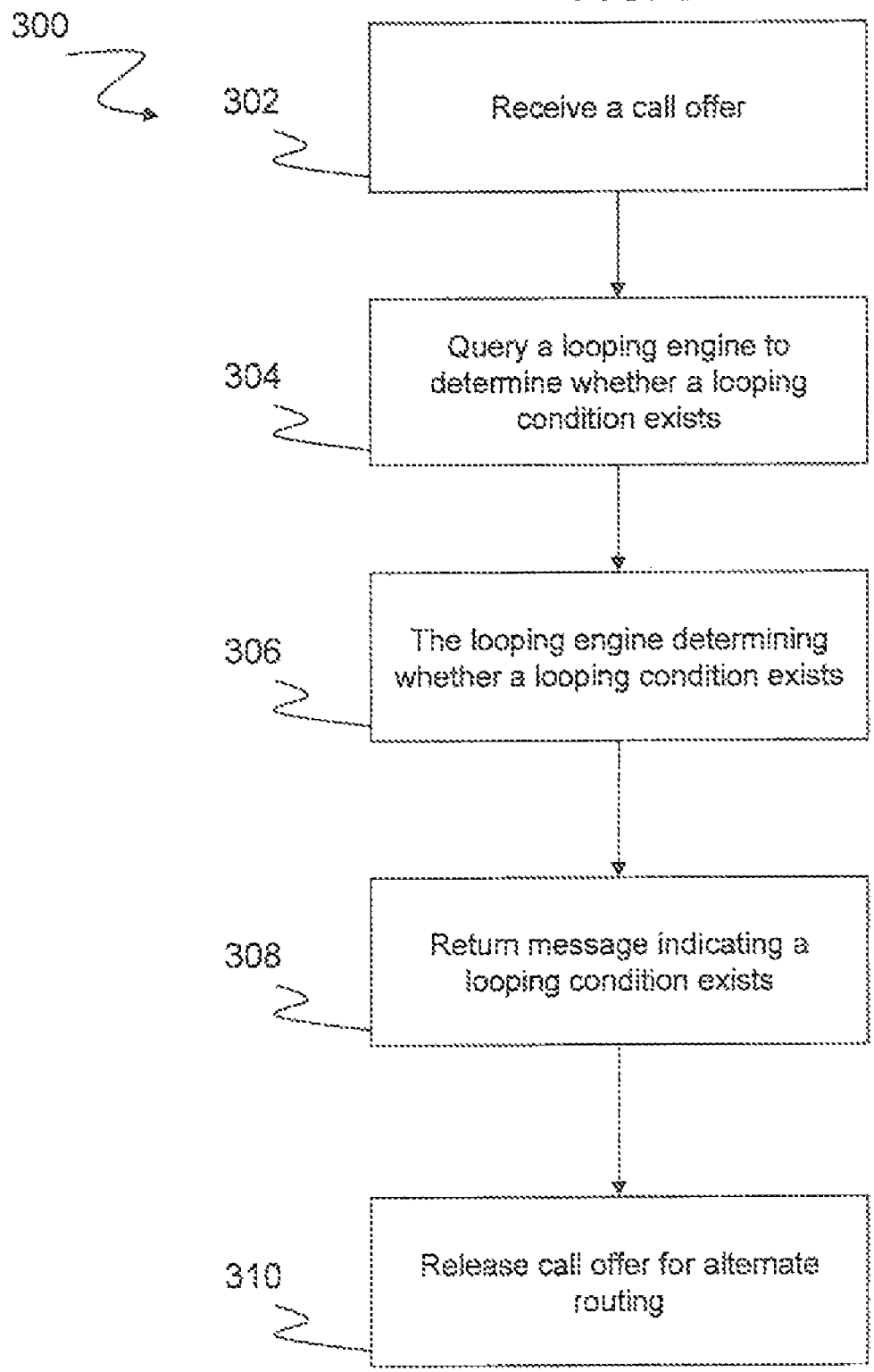

ANTI-LOOPING FOR A MULTIGATEWAY MULTI-CARRIER NETWORK

TECHNICAL FIELD

This disclosure relates generally to telecommunications, and in particular, to detecting and terminating looping conditions in a telecommunications network, such as a peering grid.

BACKGROUND

A telecommunications carrier provides telecommunications access, such as voice and data communications, to customers. Each telecommunications carrier is equipped to route calls to their destination directly (through use of their own networks), or indirectly by the networks of other telecommunications carriers if necessary.

Telecommunications carrier network can include various forms of communication networks and equipment, including but not limited to: switches, routers, hubs, repeaters, bridges, servers, etc. Such networks can include packet-switched data networks (e.g., the Internet, intranets, extranets, subnets), the public switched telephone network (PSTN), wireless networks, local area networks (LANs), wide area networks (WANs), peer-to-peer networks, satellite networks, radio and television broadcast networks, optical networks, metro area networks (MAs), computer networks, grid networks, exchanges (e.g., private branch exchange (PBX)), broadband integrated data services network (B-ISDN) access networks, digital subscriber lines (DSL), cable, etc.

A telecommunication service provider, which purchases telephone numbers from the telecommunications carrier, assigns the numbers to customers, and provides customers with implementations of communications applications, may receive a call offer, establish the call, and route the call to its destination either directly or through another service provider. When calls are routed, a call loop may occur when the call is handed off to a subsequent service provider that is unaware of the path taken by the call to reach said subsequent provider. As a result, the subsequent service provider may route the call back through a prior service provider that has already processed and forwarded the call. In this manner, the call may continue to be routed and re-routed indefinitely amongst several providers without ever reaching its destination, resulting in unnecessary routing and usage of network resources.

In effort to "fix" such looping conditions, devices such as the engine 130 shown in FIG. 1 have been developed for addressing looping conditions after they have occurred.

Turning now to FIG. 1, a conventional system 100 that utilizes the aforementioned engine 130 is illustrated. The system 100 includes a customer switch 110 for receiving call offers 101 from customers; a network switch 120 in communication with the customer switch 110 for receiving and routing the call offers 101; the engine 130, which includes a database 140, in communication with the network switch 120; and a vendor switch 150, also in communication with the network switch 120, for routing call offers 101 to their final destination.

In operation, a customer switch 110 receives a call offer 101. The call offer 101 is routed to the network switch 120 by the customer switch 110. The call offer 101 is then routed to the vendor switch 150 based on routing tables stored in the network switch 120. Since the vendor switch 150 is unaware that the call offer 101 has already been processed by switch 110, the call offer 101 may be returned back to the customer switch 110, which in turn resends the call offer 101 to the network switch 120. The network switch 120 again sends the call offer 101 to the same vendor switch 150, which returns the call offer 101 back to the customer switch 110, thereby creating a looping condition.

Each time the network switch 120 routes the call offer 101 to the vendor switch 150, certain information 103 associated with the call offer 101 is sent to the engine 120 and stored in the database 140. The database 140 keeps track of the number of times the call offer 101 is routed through the network switch 120.

Once the call offer 101 has been routed through the network switch 120 a specific number of times within a predetermined period of time, the engine 130 alerts 105 the network switch 120 that a looping condition is occurring. The network switch 120, in turn, alerts 107 the customer switch 110. One or both of the network switch 120 and customer switch 110 then updates their respective routing tables to block subsequent loops, and to prevent call offers having the same origin and destination from ever reaching the network switch 120.

Importantly, the call offer 101 will continue to loop through the system 100, even after the looping condition has been detected, until a block may be established via, for example, updating the routing tables of one or more network switches (e.g., 110, 120), which results in significant call delay and unnecessary consumption of system resources.

Therefore, there is a need for detecting and terminating a looping condition in real-time without having to update routing tables, thereby avoiding the delays and wasted resource consumption of the prior art.

SUMMARY

The present disclosure relates generally to detecting and terminating looping conditions in peering grid. In an exemplary embodiment, a call offer comprising call identification data associated with the call offer is received at a switching infrastructure which itself comprises a switching component. Prior to routing the call offer, the switching infrastructure queries a looping engine (using the call identification data) to detect a looping condition. In response, the looping engine identifies a number of occurrences of the call identification data within a predetermined time frame, compares the number of occurrences against a predetermined count, and returns a message to the switching component based on the comparison. If the number of occurrences meets or exceeds the predetermined count, the message indicates that a looping condition exists in the peering grid. Alternatively, if the number of occurrences is fewer than the predetermined count, the message indicates that a looping condition does not exist.

In an alternate embodiment, a call offer for a call destined for a telephone number is received at a switching infrastructure. This switching infrastructure comprises a switching component and a routing engine. The switching infrastructure then queries, via the routing engine, a looping engine to identify a looping condition. In response, the looping engine identifies a looping condition and returns a message to the routing engine indicating that the looping condition exists. In response to this message, the routing engine releases the call offer for alternate routing.

In yet another embodiment, an exemplary system for detecting a looping condition within a peering grid comprises a switching infrastructure which itself comprises a switching component; and a looping engine in communication with the switching component. The switching component is configured to receive one or more call offers, each comprising call identification data, and to generate and transmit one or more queries using the call identification data to the looping engine. The looping engine is configured to receive the one or more queries from the switching component and to detect a looping condition by identifying a number of occurrences of call identification data associated with at least one of the call offers within a predetermined time frame, comparing the number of occurrences against a predetermined count, and returning a message to the switching component based on the comparison, said message indicating whether a looping condition exists in the peering grid.

In another embodiment, an exemplary system for terminating a looping condition comprises a switching infrastructure and a looping engine. The switching infrastructure comprises a switching component and a routing engine, wherein the switching component is configured to receive one or more call offers and to generate and transmit one or more queries. The looping engine, which is in communication with the switching infrastructure, is configured to receive the queries, identify looping conditions, and return messages to the routing engine indicating that at least one looping condition exists. Upon receiving such a return message, the routing engine is further configured to release at least one of the call offers for alternate routing.

BRIEF DESCRIPTION OF THE DRAWINGS

FIG. 2A shows a flowchart of an exemplary process for detecting a looping condition in a Media Peering Grid™;

FIG. 3 shows a flowchart of an exemplary process for terminating a looping condition in a Media Peering Grid™;

DETAILED DESCRIPTION

Figure 1:
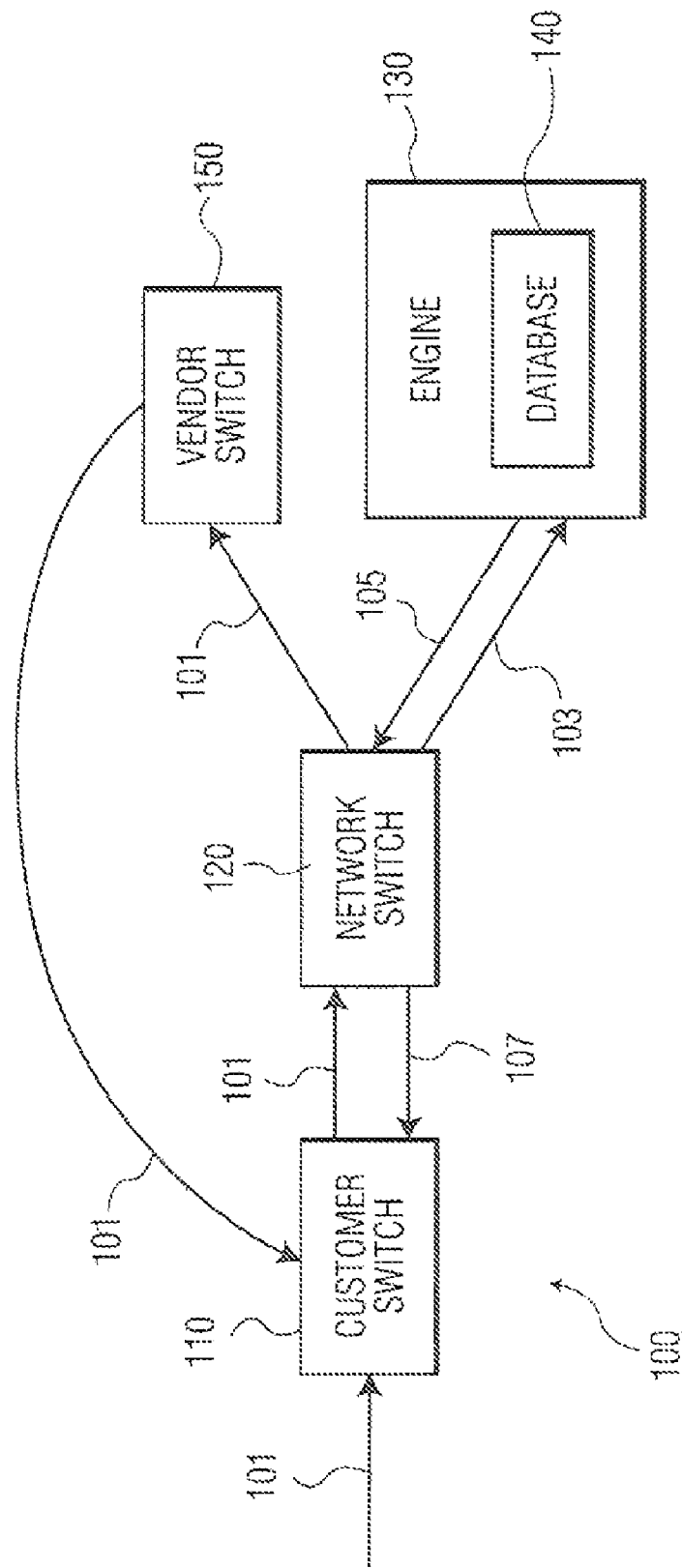
FIG. 1 shows a prior art system for detecting looping conditions once a call has been established.

It will be appreciated that the following description is intended to refer to specific examples of structure selected for illustration in the drawings and is not intended to define or limit the disclosure, other than in the appended claims.

The present disclosure provides methods and systems for detecting and terminating looping conditions in telecommunications networks, such as a peering grid. The peering grid may be a Media Peering Grid™. Notably, the methods and systems described below are able to detect looping conditions as they occur (effectively, in real-time). As a result, looping conditions may be terminated immediately, without the delay and wasteful expenditure of resources of the prior art. Moreover, the methods and systems described below do not pre-emptively block 'suspicious' call offers (e.g., a called/calling number pair that previously resulted in a looping condition) from being processed. Instead, all call offers, including those that may have resulted in looping conditions in the past, are processed on a call-by-call basis, thereby maximizing the success rate and routing efficiency within a Media Peering Grid™.

Turning now to FIG. 2A, a flowchart showing an exemplary process 200 for detecting a looping condition in a Media Peering Grid™ according to the present disclosure is shown. According to the exemplary process 200, a call offer containing call identification information is received at a switching infrastructure 202, for example. This call identification information may include, for example, a called/calling number pair. Upon receiving the call offer 202, the switching infrastructure generates and transmits a query using the call identification information 204 to a looping engine that is in communication with the switching infrastructure. In one embodiment, the query may be generated and transmitted as part of a session invitation message configured according to a session initiation protocol (SIP), a transaction capabilities application part (TCAP) protocol, a simple object access protocol (SOAP), or according to any other protocol, standard, or language suitable for use in a Media Peering Grid™.

In response to the query, the looping engine identifies the number of times (or occurrences) that the call identification data (associated with the call offer) has reached the switching infrastructure within a predetermined period of time, or time frame 206. Said another way, the looping engine identifies the number of call offers having the same call identification data that have been received at the switching infrastructure within a predetermined time period. This predetermined period of time may be defined as a "fixed window" (defined below), a "sliding window" (defined below), or as any other suitable time metric deemed appropriate for the particular embodiment; and may optionally be set by a user and stored in the looping engine.

For purposes of this disclosure, a "fixed window" refers to a predetermined duration of time that begins when a call offer is received, and lasts for a fixed period of time. Thus, for example, if a call offer having particular call identification data is received at time t=0, and the fixed period of time is 30 seconds, then an initial fixed window of time beginning at time t=0 will end at time t=0+30 s. Once the initial fixed window of time has expired, a subsequent call offer (having the same identification data) received thereafter (i.e., t>0+30) begins a new fixed window that begins when the subsequent call offer is received, and lasts for 30 seconds.

Conversely, a "sliding window" refers to a predetermined duration of time that begins when a call offer is received, but unlike the fixed window, the sliding window is continually extended by a predetermined duration until no subsequent call offers (having the same call identification data) are received for a length of time equal to the predetermined duration. For example, assuming a predetermined duration of 30 seconds, if a first call offer is received at time t=0, the sliding window of time will initially be set to expire at t=0+30. If, however, prior to time t=0+30, a subsequent call offer is received, say at time t=0+5, then the sliding window will be extended to 30 seconds beyond t=0+5, or t=0+35. The sliding window will continue to be extended in this manner until no call offers are received for 30 seconds straight. Thus, continuing with the foregoing example, if after the call offer received at time t=0+5 no additional call offers are received until time t=0+40, the initial sliding window will end at time t=0+35, and a new sliding window will commence at time t=0+40.

As will be appreciated by those of skill in the art, using a fixed window versus a sliding window could lead to the identification of a significantly different number of call offer occurrences. To illustrate this difference, Table 1 is provided below.

| Calling party "A" and called party "B" at time: | Fixed Window | | | Sliding Window | | |
|---|---|---|---|---|---|---|
| | Time Stamp | Occurrences | Result | Time Stamp | Occurrences | Result |
| t0 | t0 | 1 | PASS | t0 | 1 | PASS |
| t0 + 5 s | t0 | 2 | PASS | t0 + 5 s | 2 | PASS |
| t0 + 15 s | t0 | 3 | FAIL | t0 + 15 s | 3 | FAIL |
| t0 + 35 s | t0 + 35 s | 1 | PASS | t0 + 35 s | 4 | FAIL |
| t0 + 55 s | t0 + 35 s | 2 | PASS | t0 + 55 s | 5 | FAIL |
| t0 + 65 s | t0 + 65 s | 1 | PASS | t0 + 65 s | 6 | FAIL |
| t0 + 100 s | t0 + 100 s | 1 | PASS | t0 + 100 s | 1 | PASS |

In Table 1, the predetermined duration for the fixed window and the sliding window is assumed to be 30 seconds; and the threshold for the number of occurrences within said windows is assumed to be three (3). Thus, three or more occurrences within either the fixed window or the sliding window will result in FAIL status.

Looking first at the 'fixed window', a first call offer occurrence at time t=0 begins the predetermined duration, which ends at time t=0+30. As noted above, a new fixed window will not begin until there is a call offer (having the same identification data as the previous occurrence) received after time t=0+35. Thus, in the case shown in Table 1, the second fixed window begins at time t=0+35 and runs to time t=0+65. Referring now to the occurrences, it is noted that a call offer occurrence is recorded at time t=0, t=0+5, and t=0+15. Since all three occurrences fall within this first fixed window, the third occurrence (i.e., at t=0+15) triggers a FAIL status. The occurrence at time t=0+35, however, shows a PASS status, reflecting the fact that a new fixed window (in which occurrences are accumulated) began at time t=0+35.

Turning now to the sliding window, the call offer occurrence at time t=0 begins the predetermined duration of 30 seconds. If no other call offers are received, this initial sliding window will end at time t=0+30. However, at time t=0+5, a second call offer occurrence is received, which extends the end time of the sliding window by 5 seconds. Thus, after the second call offer, the end time of the sliding window is extended to time t=0+35. Similarly, the third call offer occurrence received at time t=0+15 further extends the sliding window by another 15 seconds, to time t=0+45. The sliding window will continue to expand in this manner until no call offers are received for 30 seconds straight.

Looking now at the result column of the sliding window, it is noted that similar to the fixed window, the third call offer occurrence results in a FAIL status. Unlike the fixed window results, however, the fourth, fifth, and sixth occurrences all result in FAIL status. This is because the sliding window has continued to be extended each time a subsequent call offer was received. Indeed, as a result of the sixth call offer occurrence, the sliding window has been extended to time t=0+95. Since the seventh call offer occurrence is not received until time t=0+100, the seventh call offer results in a PASS status.

Figure 2B:
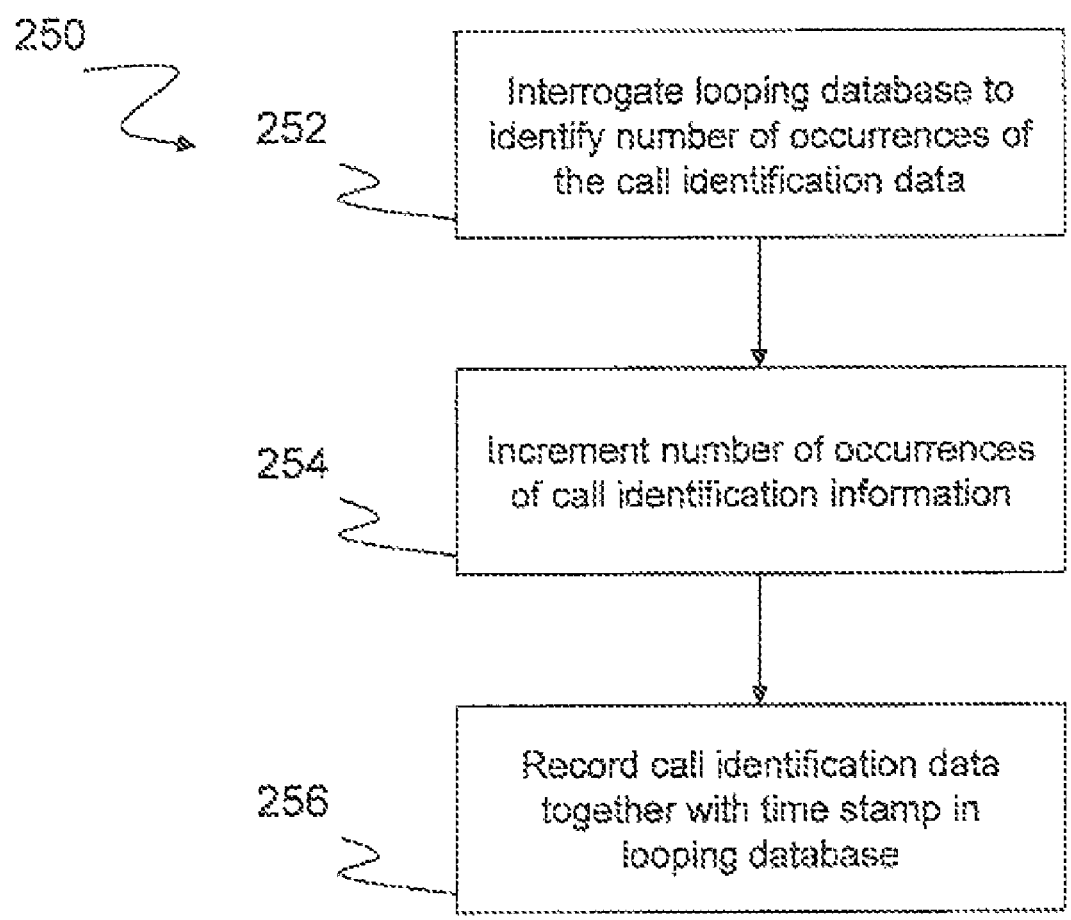
FIG. 2B shows a flowchart of an exemplary process for identifying a number of occurrences of certain call identification data within a predetermined time frame.

Returning to FIG. 2A, it is noted that the looping engine may utilize any suitable means and/or process to identify the number of occurrences 206 of particular call identification data within a predetermined period of time. Indeed, one such suitable process 250 is shown in FIG. 2B, for example. According to the exemplary process 250, the looping engine may first interrogate a looping database that comprises, or is a part of, said looping engine 252. This looping database may be utilized to store call identification data, related time stamp and time frame data, and any other type of information related to call offers. Optionally, the looping engine may also comprise a clean-up thread for deleting stale occurrences of call identification data from the looping database. These stale occurrences may include, for example, call identification data whose associated predetermined time frame has expired.

As a result of this interrogation step 252, the looping engine is able to identify a number of prior call offer occurrences. Then, to account for the instant call offer, the number of prior call offer occurrences is incremented 254. A time stamp associated with this latest call offer, together with the call offer identification data, may then be recorded in the database 256 for future reference.

Notably, the order of the steps 252-256 as illustrated in FIG. 2B does not indicate a required order, but instead, one example sequence for identifying the number of occurrences of the call identification data within a predetermined period of time. Indeed, this process 250 may have first recorded the call identification data 256 and then interrogated the looping database 254, for example.

Referring again to FIG. 2A, once the number of occurrences of the call identification data is identified 206, the looping engine compares the number of occurrences against a predetermined count 208 that may, for example, comprise a threshold that is indicative of a looping condition. This predetermined count or threshold may be set (and/or updated) by a user and stored in the looping engine. Upon comparing the number of occurrences to the predetermined count 208, a determination is made as to whether the number of occurrences meets or exceeds the predetermined count 210. If it is determined that the number of occurrences does not meet or exceed the predetermined count (i.e., the number of occurrences is less than the predetermined count), the looping engine returns a message to the switching infrastructure indicating that a looping condition does not exist 212. If, however, it is determined that the number of occurrences meets or exceeds the predetermined count, the looping engine returns a message to the switching infrastructure indicating that a looping condition exists 214.

According to an exemplary embodiment, the message returned by the looping engine indicating that a looping condition exists may comprise a two-parameter code comprising a switch identification (SWID) and a trunk group identification (TGID), for example. Such a message may be interpreted by the switching component as a loop lock command, for example, which in turn could cause the switching component to release the call offer for alternative routing.

Alternatively, the message returned to the switching infrastructure may comprise a 300 redirect response message, or any other form of message suitable for communicating in a Media Peering Grid™, for example.

Turning now to FIG. 3, a flowchart illustrating an exemplary process 300 for terminating a looping condition (once detected) in a Media Peering Grid™ is shown. According to the exemplary process 300, call offer, which includes call identification information and is destined for a telephone number, is received at a switching infrastructure 302. In accordance with an embodiment of the present disclosure, this call identification data may comprise a called/calling number pair, for example.

Upon receiving the call offer 302, the switching infrastructure queries a looping engine to determine whether a looping condition exists 304. This query may optionally include call identification data, and it may be generated and transmitted to the looping engine as part of a session invitation message configured according to SIP, TCAP, SOAP, or any other protocol, standard, or language that is suitable for communicating in a Media Peering Grid™.

Optionally, the looping engine may comprise a looping database (that is a part of, or independent of, the looping engine) for storing call identification data, related time stamp and time frame data, and other information related to call offers. In addition, the looping engine may further optionally comprise a clean-up thread for deleting stale occurrences of call identification data from the looping database. A stale occurrence may, for example, include call identification data whose associated predetermined time has expired.

In response to the query 304, the looping engine is able to determine whether a looping condition exists 306. Notably, the looping engine may utilize any suitable means for making such a determination 306. In one embodiment, for example, wherein the looping engine comprises a looping database as described above, the looping engine may utilize the exemplary process 350 illustrated in FIG. 2B to identify a looping condition. That is to say, the looping engine may interrogate a looping database to identify a number of occurrences (of certain call identification data) within a predetermined time frame, increment the number of occurrences to account for the instant call offer, and then record the call identification data together with a time stamp in the looping database. Then, if the number of occurrences meets or exceeds a predetermined count (or threshold) within a predetermined time frame (e.g., a fixed window, a sliding window, or any other time metric), the looping engine is able to determine that a looping condition does in fact exist 306. Notably, the predetermined count and/or the predetermined time frame may be set and/or updated by a user as desired.

Notably, the looping engine according to the present disclosure is not limited to the process if FIG. 2B. To the contrary, any suitable algorithm may be implemented and utilized by the looping engine to identify the existence of a looping condition.

Upon determining that a looping condition exists 306, the looping engine returns a message to the switching infrastructure indicating the same 308. Such a message may comprise a two-parameter code comprising, for example, a SWID and a TGID, which may be interpreted by the routing engine as a loop lock command, thereby causing the routing engine release the call offer for alternate routing 310.

Figure 4:
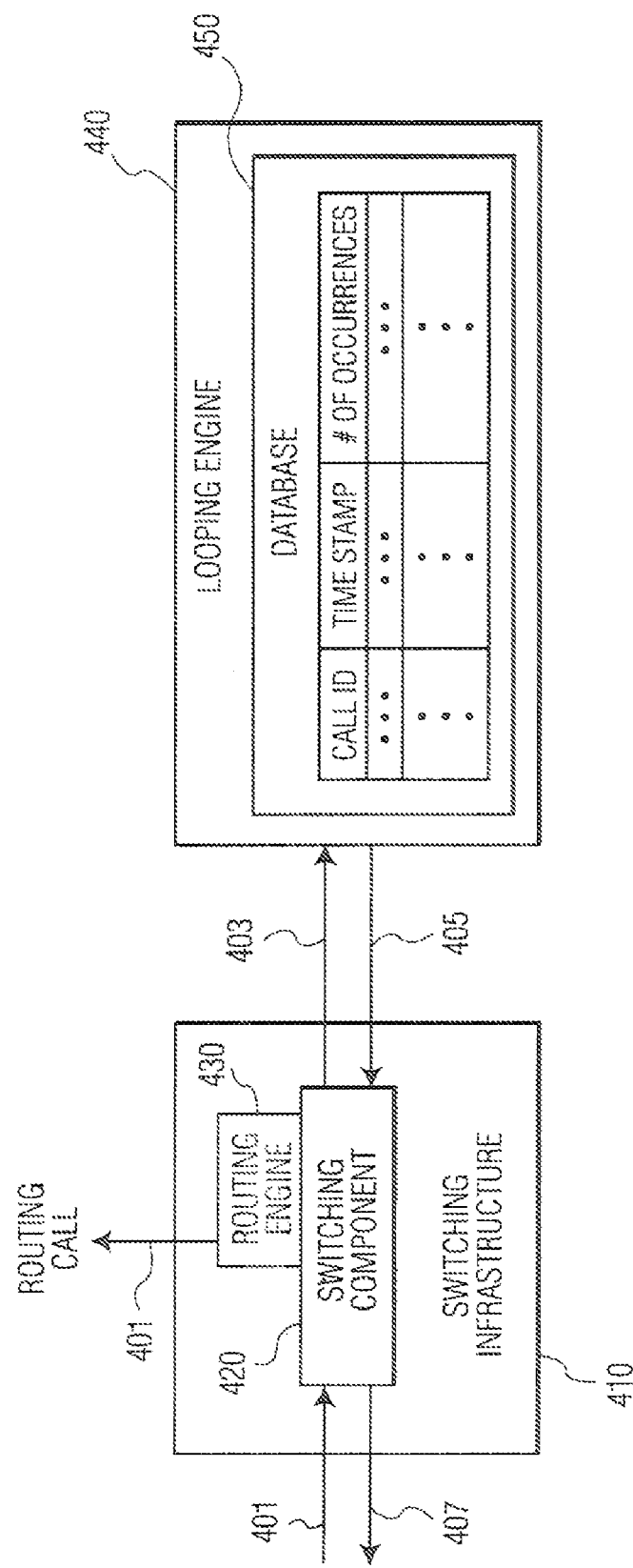
FIG. 4 shows a block diagram of an exemplary system for detecting and terminating a loop condition in a Media Peering Grid™.

Reference is now made to FIG. 4, wherein an exemplary system 400 for detecting and terminating looping conditions in a Media Peering Grid™ is shown. The exemplary system 400 comprises a switching infrastructure 410, which may comprise a switching component 420 and a routing engine 430, configured to receive call offers, route call offers, generate and transmit queries, process query response messages, and release call offers for alternate routing; and a looping engine 440 in communication with the switching infrastructure 410 comprising a looping database 450 for storing call identification data, related predetermined time frame and timestamp data, occurrence data, and any other data or information related to call offers. The looping engine 440 in this exemplary system 400 is configured to receive and process queries (e.g., from the switching infrastructure 410), detect and identify looping conditions, and generate and transmit response messages to the switching infrastructure 410.

Notably, although the switching infrastructure 410 is shown as a single structure, it should be understood that said infrastructure 410 may comprise one or more components/devices, at least one of which comprises a memory for storing instructions and at least one processor for executing those instructions, wherein the execution of said instructions causes at least one of the switching component and routing engine to function as described below. Such components/devices may include, without limitation, servers, personal computers, handheld communication devices, mobile phones, pagers, personal device assistants (PDAs), kiosks, wireless fidelity (WiFi) access points, routers, machines, equipment, hardware, and/or other computing devices. Similarly, the looping engine may itself comprise one or more such components/devices, thereby causing the looping engine and/or the looping database to function as further described below.

In operation, the system 400 of FIG. 4 may be configured to detect looping conditions by first receiving a call offer 401 via the infrastructure's 410 switching component 420. This call offer 401 may include call identification data associated with the call offer 401, such as a called/calling number pair and/or any other information related to the call offer 401, for example. Upon receiving the call offer 401, the switching component 420 generates a query 403 and transmits the query 403 to the looping engine 440. Optionally, the query 401 may include the call offer 401 identification data, and it may be generated and transmitted, for example, as part of a session invitation message according to a session initiation protocol (SIP), a transaction capabilities application party (TCAP) protocol, a simple object access protocol (SOAP), or according to any other protocol, standard or language that is suitable for communicating in a Media Peering Grid™. Notably, this querying step is preferably executed before the switching infrastructure 410 attempts to route the call offer 401, thereby avoiding perpetuating any looping condition that may already exist.

Upon receiving the query 401, the looping engine 440 identifies the number of occurrences of the call identification data associated with the call offer 401 within a predetermined time frame. To that end, the looping engine 440 may further be configured to interrogate the looping database 450 to extract occurrence and time data (associated with the call offer 401) previously stored therein. This occurrence data may then be incremented to account for the current call offer 401; and the call identification data of the current call offer 401, together with a time stamp, may then be recorded in the looping database 450 for future reference. Optionally, the looping engine 440 may further comprise a clean-up thread which causes the looping engine 440 to delete stale occurrences of call identification data from the looping database 450, where stale data comprises call identification data whose associated predetermined time frame has expired.

Once the number of occurrences has been identified, the looping engine 440 compares said number of occurrences to a predetermined count, and generates and returns a message 405 to the switching component 420 based on the comparison. In an exemplary embodiment, both the predetermined time frame and predetermined count may be set and/or updated by a user as desired, and stored via the looping database 450. In the case of the predetermined time frame, such user may set the predetermined time frame as a fixed window or as a sliding window, as those terms have been defined above.

Following the comparison, if the looping engine 440 determines that the number of occurrences meets or exceeds the predetermined count, a message 405 indicating that a looping condition exists is generated and communicated to the switching infrastructure 410. Optionally, such a message 405 may include a two-parameter code comprising a switch identification (SWID) and a trunk group identification (TGID) that may be interpreted by the switching component 420 as a loop lock command for releasing the call 407, for example.

If, however, the number of occurrences is fewer than the predetermined count, the message 405 indicates that no looping condition exists. In either event, if the switching component 420 and the looping engine 440 are communicating according to a session initiation protocol (SIP), this return message 405 may optionally be configured as a 300 redirect request response message In an alternate embodiment, the exemplary system 400 may further be configured to terminate looping conditions once detected. Indeed, upon receiving the message 405 indicating that a looping condition exists, the switching infrastructure 410 (via the routing engine 430) may be further configured to release the call offer 407 for alternate routing. In the case where the message 405 includes a two-parameter code comprising a switch identification (SWID) and a trunk group identification (TGID), which as described above may be interpreted as a loop lock command, the message 405 itself may be the catalyst for such a release 407. Upon interpreting such a loop lock command, the switching component 420 may instruct the routing engine 430 to release the call offer 407, rather than attempting to route the call offer.

Although the apparatus and methods have been described in connection with specific forms thereof, it will be appreciated that a wide variety of equivalents may be substituted for the specified elements described herein without departing from the spirit and scope of this disclosure as described in the appended claims.

What is claimed is:

1. A method of detecting a looping condition within a peering grid, comprising:
    receiving, at a switching infrastructure, a call offer comprising call identification data associated with said call offer, said infrastructure comprising a switching component;
    querying a looping engine using said call identification data to detect a looping condition; and
    said looping engine:
        identifying a number of occurrences of the call identification data within a predetermined time frame;
        comparing the number of occurrences against a predetermined count; and
        returning a message to said switching component based on said comparison, said message indicating that a looping condition exists in said peering grid, said message comprises a two-parameter code comprising a switch identification (SWID) and a trunk group identification (TGID) which is interpreted by the switching component as a loop lock command; and
    said switching releasing said call offer for alternate routing.

2. The method of claim 1, wherein said message indicates that a looping condition exists if the number of occurrences meets or exceeds the predetermined count; and
    wherein said message indicates that no looping condition exists if the number of occurrences is fewer than the predetermined count.

3. The method of claim 1, wherein said looping engine comprises a database storing call identification data and related time stamp and time frame data, said looping engine interrogating the looping database to identify the number of occurrences of the call identification data of said call offer within said predetermined time frame.

4. The method of claim 1, wherein said querying step comprises generating and transmitting a query as part of a session invitation message configured according to one of a session initiation protocol (SIP), a transaction capabilities application part (TCAP) protocol and a simple object access protocol (SOAP).

5. The method of claim 1, wherein at least one of said predetermined time frame and predetermined count are preset by a user and stored in the looping engine.

6. The method of claim 1, wherein the predetermined time frame is one of a fixed window of time and a sliding window of time.

7. The method of claim 4, wherein information between said switching component and said looping engine is exchanged via SIP, and wherein the message returned by the looping engine is a 300 redirect request response message.

8. The method of claim 3, further comprising:
    upon interrogating the looping database, recording the call identification data together with a time stamp associated with the call offer in said looping database; and
    incrementing the number of occurrences of said call identification data.

9. The method of claim 3, wherein the looping engine comprises a clean-up thread, the method further comprising:
    deleting stale occurrences of call identification data from said looping database, wherein a stale occurrence comprises call identification data whose associated predetermined time frame has expired.

10. The method of claim 1, wherein the call identification data associated with the call offer comprises a called/calling number pair.

11. A method of detecting a looping condition within a peering grid, comprising:
    receiving, at a switching infrastructure, a call offer comprising call identification data associated with said call offer, said infrastructure comprising a switching component;
    querying a looping engine using said call identification data to detect a looping condition, said looping engine comprising a looping database and a clean-up thread; and
    said looping engine:
        interrogating the looping database to identify a number of occurrences of the call identification data within a predetermined time frame;
        comparing the number of occurrences against a predetermined count;
        returning a message to said switching component based on said comparison, said message indicating whether a looping condition exists in said peering grid; and
        deleting stale occurrences of call identification data from said looping database, wherein a stale occurrence comprises call identification data whose associated predetermined time frame has expired.

12. The method of claim 11, wherein the message indicating that a looping condition exists comprises a two-parameter code comprising a SWID and a TGID which is interpreted by the routing engine as a loop lock command.

13. The method of claim 11, wherein said querying step comprises transmitting a query comprising call identification data associated with the call offer to said looping engine, said query being transmitted as part of a session invitation message configured according to one protocol selected from the group consisting of SIP, TCAP, and SOAP.

14. The method of claim 13, wherein said looping engine comprises a looping database storing call identification data and related time stamp and time frame data, the method further comprising said looping engine identifying a looping condition by:
  interrogating the looping database to identify a number of occurrences of the call identification data associated with the call offer within a predetermined time frame; and
  if the number of occurrences meets or exceeds a predetermined count, said looping engine returning the message to said routing engine indicating that a looping condition exists.

15. The method of claim 14, wherein at least one of the predetermined time frame and predetermined count is preset by a user.

16. The method of claim 14, wherein the predetermined time frame is one of a fixed window of and a sliding window of time.

17. The method of claim 14, further comprising:
  upon interrogating the looping database, recording the call identification data together with a time stamp associated with the call offer in said looping database; and
  incrementing the number of occurrences of call identification data within the predetermined time frame.

18. The method of claim 14, wherein the looping engine comprises a clean-up thread, the method further comprising:
  deleting stale occurrences of call identification data from said looping database, wherein a stale occurrence comprises a call identification data whose associated predetermined time frame has expired.

19. The method of claim 11, wherein the call identification data associated with the call offer comprises a called/calling number pair.

20. A method of terminating a looping condition, comprising:
  receiving, at a switching infrastructure, a call offer for a call destined for a telephone number, said switching infrastructure comprising a switching component and a routing engine;
  querying, via said routing engine, a looping engine to identify a looping condition;
  said looping engine identifying a looping condition and returning a message to said routing engine indicating that said looping condition exists; and
  said routing engine releasing the call offer for alternate routing,
  wherein the message indicating that a looping condition exists comprises a two-parameter code comprising a SWID and a TGID which is interpreted by the routing engine as a loop lock command.

21. The system of claim 20, wherein said message indicates that a looping condition exists if said number of occurrences meets or exceeds said predetermined count; and
  wherein said message indicates that no looping condition exists if said number of occurrences is fewer than said predetermined count.

22. The system of claim 20, wherein said looping engine comprises a looping database storing call identification data and related time stamp and time frame data, said looping engine being further configured to interrogate said looping database to identify said number of occurrences of said call identification data of said at least one call offer within said predetermined time frame.

23. The system of claim 20, wherein said switching component is further configured to generate and transmit a query to said looping engine as part of a session invitation message configured according to one of a session initiation protocol (SIP), a transaction capabilities application part (TCAP) protocol and a simple object access protocol (SOAP).

24. The system of claim 20, wherein at least one of said predetermined time frame and predetermined count are preset by a user and stored in said looping engine.

25. The system of claim 20, wherein said predetermined time frame is one of a fixed window of time and a sliding window of time.

26. The system of claim 23, wherein information is exchanged between said switching component and said looping engine via SIP, and wherein said message returned by said looping engine is a 300 redirect request response message.

27. The system of claim 22, wherein said looping engine is further configured to record said call identification data together with a time stamp associated with said at least one call offer in said looping database; and
  increment said number of occurrences of said call identification data.

28. The system of claim 22, wherein said looping engine comprises a clean-up thread which causes said looping engine to delete stale occurrences of call identification data from said looping database, wherein a stale occurrence comprises call identification data whose associated predetermined time frame has expired.

29. The system of claim 20, wherein said call identification data associated with said at least one call offer comprises a called/calling number pair.

30. A method of terminating a looping condition, comprising:
  receiving, at a switching infrastructure, a call offer for a call destined for a telephone number, said switching infrastructure comprising a switching component and a routing engine;
  providing a looping engine comprising a looping database and a clean-up thread;
  querying, via said routing engine, said looping engine to identify a looping condition, wherein said querying step comprises transmitting a query comprising call identification data associated with the call offer to said looping engine, said query being transmitted as part of a session invitation message configured according to one protocol selected from the group consisting of SIP, TCAP, and SOAP;
  said looping engine interrogating the looping database to identify a number of occurrences of the call identification data associated with the call offer within a predetermined time frame, wherein, if the number of occurrences meets or exceeds a predetermined count, said looping engine returning the message to said routing engine indicating that a looping condition exists;
  deleting stale occurrences of call identification data from said looping database, wherein a stale occurrence comprises a call identification data whose associated predetermined time frame has expired; and
  said routing engine releasing the call offer for alternate routing.

31. The system of claim 30, wherein said message indicates that a looping condition exists and wherein said message comprises a two-parameter code comprising a switch identification tag (SWID) and a trunk group identification (TGID) which is interpreted by said switching component as a loop lock command, said switching component being further configured to release said at least one call offer for alternate routing in response to said loop lock command.

32. A system for detecting a looping condition within a peering grid, comprising:
- a switching infrastructure comprising a switching component configured to receive one or more call offers each comprising call identification data, and to generate and transmit one or more queries using said call identification data; and
- a looping engine in communication with said switching component and configured to receive said one or more queries and detect a looping condition by:
  - identifying a number of occurrences of call identification data associated with at least one of said call offers within a predetermined time frame,
  - comparing said number of occurrences against a predetermined count, and
  - returning a message to said switching component based on said comparison, said message indicating that a looping condition exists in said peering grid, said message comprises a two-parameter code comprising a switch identification tag (SWID) and a trunk group identification (TGID) which is interpreted by said switching component as a loop lock command,
- said switching component being further configured to release said at least one call offer for alternate routing in response to said loop lock command.

33. A system for detecting a looping condition within a peering grid, comprising:
- a switching infrastructure comprising a switching component configured to receive one or more call offers each comprising call identification data, and to generate and transmit one or more queries using said call identification data; and
- a looping engine comprising a looping database storing call identification data and related time stamp and time frame data, said looping engine in communication with said switching component and configured to receive said one or more queries and detect a looping condition by interrogating said looping database to identify a number of occurrences of call identification data associated with at least one of said call offers within a predetermined time frame, comparing said number of occurrences against a predetermined count, and returning a message to said switching component based on said comparison, said message indicating whether a looping condition exists in said peering grid,
- said looping engine further comprising a clean-up thread which causes said looping engine to delete stale occurrences of call identification data from said looping database, wherein a stale occurrence comprises call identification data whose associated predetermined time frame has expired.

34. The system of claim 33, wherein said message indicating that a looping condition exists and said message comprises a two-parameter code comprising a SWID and a TGID which is interpreted by said routing engine as a loop lock command.

35. The system of claim 33, wherein said routing engine is further configured to generate a query which comprises call identification data associated with said at least one call offer to said looping engine, and to transmit said query as part of a session invitation message configured according to one protocol selected from said group consisting of SIP, TCAP, and SOAP.

36. The system of claim 35, wherein said looping engine comprises a looping database storing call identification data and related time stamp and time frame data, said looping engine being configured to identify a looping condition by:
- interrogating said looping database to identify a number of occurrences of said call identification data associated with said at least one call offer within a predetermined time frame; and
- if said number of occurrences meets or exceeds a predetermined count, returning said message to said routing engine indicating that a looping condition exists.

37. The system of claim 36, wherein at least one of said predetermined time frame and predetermined count is preset by a user.

38. The system of claim 36, wherein said predetermined time frame is one of a fixed window of time and a sliding window of time.

39. The system of claim 36, wherein said looping engine is further configured to record said call identification data together with a time stamp associated with said at least one call offer in said looping database, and increment said number of occurrences of call identification data within said predetermined time frame.

40. The system of claim 36, wherein said looping engine comprises a clean-up thread, which causes said looping engine to delete stale occurrences of call identification data from said looping database, wherein a stale occurrence comprises a call identification data whose associated predetermined time frame has expired.

41. The system of claim 33, wherein said call identification data associated with said at least one call offer comprises a called/calling number pair.

42. A system for terminating a looping condition, comprising:
- a switching infrastructure comprising a switching component configured to receive one or more call offers and to generate and transmit one or more queries, and a routing engine; and
- a looping engine in communication with said switching infrastructure, said looping engine being configured to receive said queries, identify looping conditions, and return messages to said routing engine indicating whether at least one looping condition exists,
- said looping engine comprising a clean-up thread and looping database storing call identification data and related time stamp and time frame data,
- said looping engine identifying a looping condition by interrogating said looping database and identifying a number of occurrences of said call identification data associated with said at least one call offer within a predetermined time frame, wherein if said number of occurrences meets or exceeds a predetermined count, said looping engine returns a message to said routing engine indicating that a looping condition exists,
- said clean-up thread causing said looping engine to delete stale occurrences of call identification data from said looping database, wherein a stale occurrence comprises a call identification data whose associated predetermined time frame has expired, and
- said routing engine configured to release at least one of said call offers for alternate routing in response to a return message from said looping engine, and to generate a query which comprises call identification data associated with said at least one call offer to said looping engine, and to transmit said query as part of a session invitation message configured according to one protocol selected from said group consisting of SIP, TCAP, and SOAP.

* * * * *